United States Patent [19]

Popiolek

[11] 4,078,733
[45] Mar. 14, 1978

[54] APPARATUS FOR SEPARATING AND DISTRIBUTING ROLLED BALES OF AGRICULTURAL MATERIAL

[75] Inventor: Franz Michael Popiolek, Wolfenbuttel, Germany

[73] Assignee: Gebrüder Welger, Wolfenbuttel, Germany

[21] Appl. No.: 745,211

[22] Filed: Nov. 26, 1976

[30] Foreign Application Priority Data

Nov. 28, 1975 Germany .............................. 2553492

[51] Int. Cl.² .......................... B02C 11/02; D01B 1/00
[52] U.S. Cl. ......................................... 241/200; 19/81; 241/101.7
[58] Field of Search ................. 222/80, 185, 415, 614, 222/626, 627; 19/80 R, 81; 214/1 HA, 83.36; 241/101.7, 200; 242/86.5 R; 198/415, 692

[56] References Cited

U.S. PATENT DOCUMENTS

| 573,931 | 12/1896 | Swenson | 19/80 R |
| 574,048 | 12/1896 | Swenson | 19/80 R |
| 3,874,609 | 4/1975 | Larson | 214/83.36 X |
| 4,025,006 | 5/1977 | Turnbow | 242/66 X |

*Primary Examiner*—Robert B. Reeves
*Assistant Examiner*—Fred A. Silverberg
*Attorney, Agent, or Firm*—Toren, McGeady and Stanger

[57] ABSTRACT

A large rolled bale of agricultural material is separated and distributed by placement upon a first and a second endless conveyer placed end to end and driven in the same direction to turn the rolled bale while drawing therefrom portions of the agricultural material from which the bale is composed. As the bale is rotated, agricultural material drawn from the bale by tines extending from the second endless conveyer is deposited from the discharge end of the second endless conveyer. The endless conveyers are arranged with an inclined posture relative to the horizontal with the second conveyer having a steeper incline than the first conveyer and with the second conveyer being driven at a higher speed than the first conveyer.

11 Claims, 2 Drawing Figures

APPARATUS FOR SEPARATING AND DISTRIBUTING ROLLED BALES OF AGRICULTURAL MATERIAL

BACKGROUND OF THE INVENTION

The present invention relates generally to agricultural equipment and more particularly to a device which may be attached to a tractor and which operates to separate and distribute rolled bales of agricultural material, such as fodder crops. Generally, the device of the present invention is of the type which receives therein the material to be separated in a form of a large rolled bale and rotates the bale while drawing from the outer circumference thereof portions of material which are to be distributed along the ground. The rolled bale of material is generally formed with a horizontal axis and when feeding of cattle is desired, devices such as those of the present invention may be used for distributing the crop on a feed passage of stallings and for distributing bedding material.

Devices of the type to which the present invention relates may comprise a receiving frame with a claw array and limiting walls arranged on both sides and adapted to the diameter of the rolled bale with the horizontal center axis. In the case of known devices, for example as disclosed in U.S. Pat. No. 3,874,609, an exit gap is left beneath the limiting wall on the discharge side and after undoing the ties of a roll bale the latter is caused to perform a rolling movement by putting the claw array into operation. The intention is to unroll the layers of crop which are rolled up during the production of the bale and such unrolled layers are to be thrown out laterally to the exit gap. This device was not found to be satisfactory since in the case of most harvest crops the layers of the crop are not in a condition in which they can be separated again and they become entangled due to the pressing operation. The discharge of the crop would not only occur very regularly but it would also become very uncertain owing to blockage just inside the outlet gap. Furthermore, if the rolled bale were to be laid in the device against its direction of rolling up, no pulling apart could take place.

Furthermore, charging devices for conveyer blowers or the like have been proposed which accept a load of loose harvest crop from a cart for feeding it in a controlled fashion. They comprise a horizontal claw array which is horizontal or slightly inclined in the direction of discharge and is followed by an oblique conveyer which tugs off portions from the loose pile of fodder crop and throws it into the loading hopper of the following conveying unit. Such charging devices are not suitable for pulling apart rolled bales. A rolled bale would in such a case either ride back on the claw array against the direction of conveyance or it would be thrown back again by the entraining parts of the oblique conveyer if it should come up against the latter. It is neither possible nor desirable to cause the loose pile of crop to perform a rolling movement. Furthermore, there do not appear to be any suggestions as to how the problem could be solved.

On the other hand, the present invention is based upon the consideration that the cylindrical form of a rolled bale can be exploited for pulling the bale by causing the bale to perform an even rotational movement and the intention of the invention is to press a rolled bale evenly against a driven tool adapted to pull it apart, this being so not only at the beginning of the separating or pulling apart action but also later as the remaining part of the bale becomes smaller and smaller.

A further aim of the invention is to separate material from rolled bales of all fodder crops in different conditions continuously and without breakdown or stoppage while at the same time providing for an even controlled distribution. It should be of no significance in what direction of rotation the rolled bale is placed in position in the device. Furthermore, the device should be easily operated by a person sitting upon the seat of a tractor. The device itself should be low in weight and its overall breadth should be small in order to prevent obstruction when driving through gates or passages.

SUMMARY OF THE INVENTION

Briefly, the present invention may be described as apparatus for separating and distributing the rolled bales of agricultural materials comprising a first conveyer means and a second conveyer means each having a receiving end and a discharge end. Each of the conveyer means consists of a generally planar conveyer bed extending between the discharge end and the receiving end thereof and along which the agricultural material to be separated and distributed is moved. The rolled bale of agricultural material is placed upon the two conveyer means and as the conveyer means are driven the bale of agricultural material is rotated and portions of the material are separated from the outer circumference thereof and discharged over the discharge end of the second conveyer means. The conveyer means are arranged with the discharge end of the first conveyer means extending generally parallel to and adjacent the receiving end of the second conveyer means so that the agricultural material may move in a given direction from the first conveyer means onto the second conveyer means as the bale is rotated. Each of the conveyer beds of the conveyer means are arranged to extend in an inclined direction relative to the horizontal, with the receiving end of the first conveyer means being higher than the discharge end thereof and with the discharge end of the second conveyer means being higher than the receiving end thereof.

By a particular feature of the present invention, the second conveyer means is driven to operate at a higher speed than the first conveyer means.

Furthermore, the second conveyer means is arranged so that its conveyer bed will have a steeper incline than the conveyer bed of the first conveyer means.

In accordance with the present invention, the first conveyer means is composed of a claw array which is inclined downwardly toward the discharge side thereof and is provided with retaining means. The second conveyer means operates as a limiting wall on the discharge side of the apparatus and is constructed as an oblique conveyer adapted to be driven in the same direction of movement as the claw array with a higher advance speed than the latter with the oblique conveyer being provided with conveying tines. Owing to the inclination of the claw array or first conveyer means, it is possible to insure that the rolled bale is not only pressed by the claw array advance against the second conveyer means or oblique conveyer, but also additionally by a small but nevertheless substantial component due to gravity. This gravity component causes the rolled bale to perform a rolling movement. Since it turns more rapidly than the claw array, its conveying tines pull an even layer of material from the rolling bale. In order to insure that the rolled bale does not, for instance, assume the same peripheral speed as that of the oblique conveyer, the claw array on which the main part of the weight of the bale rests is provided with retaining means.

The construction in accordance with the invention makes possible an even pulling apart of a bale and distribution of hay, straw and silage material therefrom. Furthermore, bales which have been placed in position in a direction opposite to their direction of winding are pulled apart. The even discharge makes possible feeding without manual labor in an economical manner. Furthermore, it reduces the possibility of delays or inoperative periods of the device which might otherwise be caused by overloading or jamming.

It has been found to be significant with regard to the present invention that the angle of inclination of the second conveyer means should be larger than the angle of inclination of the first conveyer means. Preferably, the first conveyer means should have an inclination of from about 10° to 25° and the second conveyer means should have an upward slope of from about 35° to 50°.

A particularly advantageous separating action of the material of the bale by the apparatus is achieved if the second conveyer means is driven with a speed which is twice as fast as the speed at which the first conveyer means is driven. It will be understood that the relative speeds of the conveyer devices will have an effect upon the results achieved. For example, if there were to be an excessively small difference in advance between the first conveyer means and the second conveyer means, such an advance difference would be compensated for by the elasticity of the bale; the tines of the second conveyer means would not pull off any material. In the case of the opposite extreme, however, the tines of the second conveyer means operating with an excessively high speed would dig out a recess on one side of the bale only rotating slowly so that the center of gravity of the bale would recede and it would fall back. The advance ratio provided for of approximately 1 to 2 on the other hand insures detachment of the material around the entire bale so that a layer is detached with a thickness equal approximately to the wound up layer of the bale.

A particularly satisfactory operation of the retaining means of the first conveyer means is achieved if the latter is fitted with transverse bars provided with retaining tines adapted to penetrate the rolled bale. In a similar manner, the second conveyer means may consist of two chains joined with transverse bars provided with tearing tines.

In order to avoid any danger that the rolled bale may be entrained bodily by the second conveyer means and be thrown out without being pulled apart, there is further provided in accordance with the invention an arrangement wherein the discharge level of the second conveyor means is located above the first conveyer means a distance which is at least one quarter of the maximum diameter of the rolled bale.

In order to improve operation of the second conveyor means without causing stoppages there may be provided on the discharge side of the second conveyor means stripping means for the tearing tines. They are intended to prevent the entrainment of pieces of material behind the upper point of the reversal of the second conveyor means.

In accordance with a preferred embodiment of the invention, a limiting wall is provided opposite the second conveyor means which consists essentially of a tail gate or grid which may be easily held in position by a plugged retainer. It may, however, be pivoted at its lower edge so as to allow pivoting movement and fixing in the receiving frame. For reinforcing the pressure of the rolled bale against the second conveyor means, the pivoted limiting wall or tail gate may be acted upon by a spring.

The various features of novelty which characterize the invention are pointed out with particularity in the claims annexed to and forming a part of this disclosure. For a better understanding of the invention, its operating advantages and specific objects attained by its use, reference whould be had to the accompanying drawings and descriptive matter in which there is illustrated and described a preferred embodiment of the invention.

DETAILED DESCRIPTION OF THE PREFERRED EMBODIMENT

Figure 1:
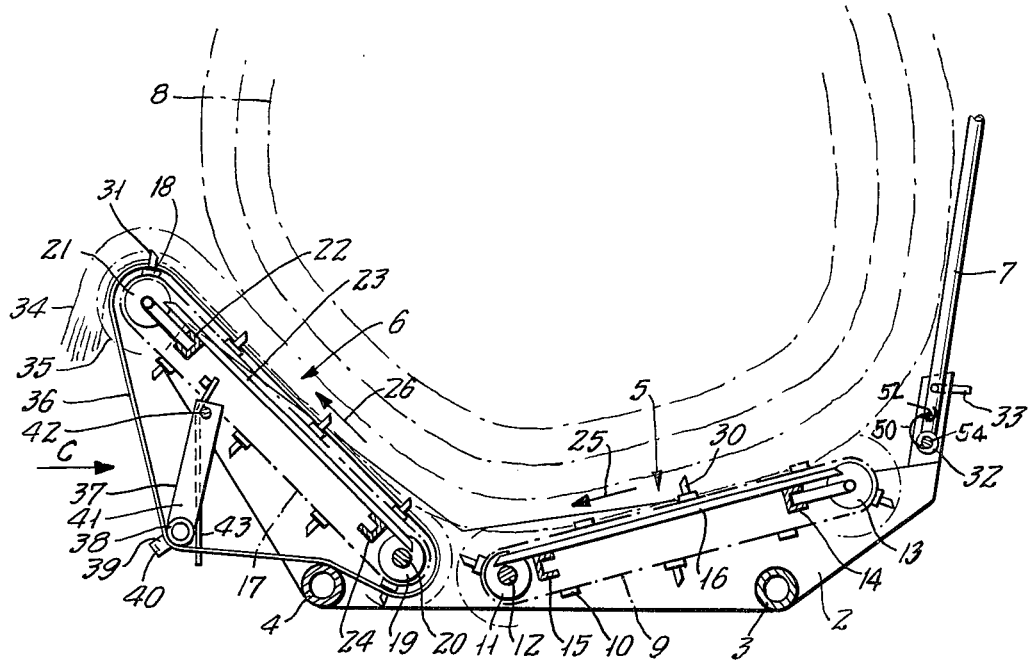
FIG. 1 is a side elevation taken through the line A–B of FIG. 2 of the apparatus in accordance with the present invention.
Figure 2:
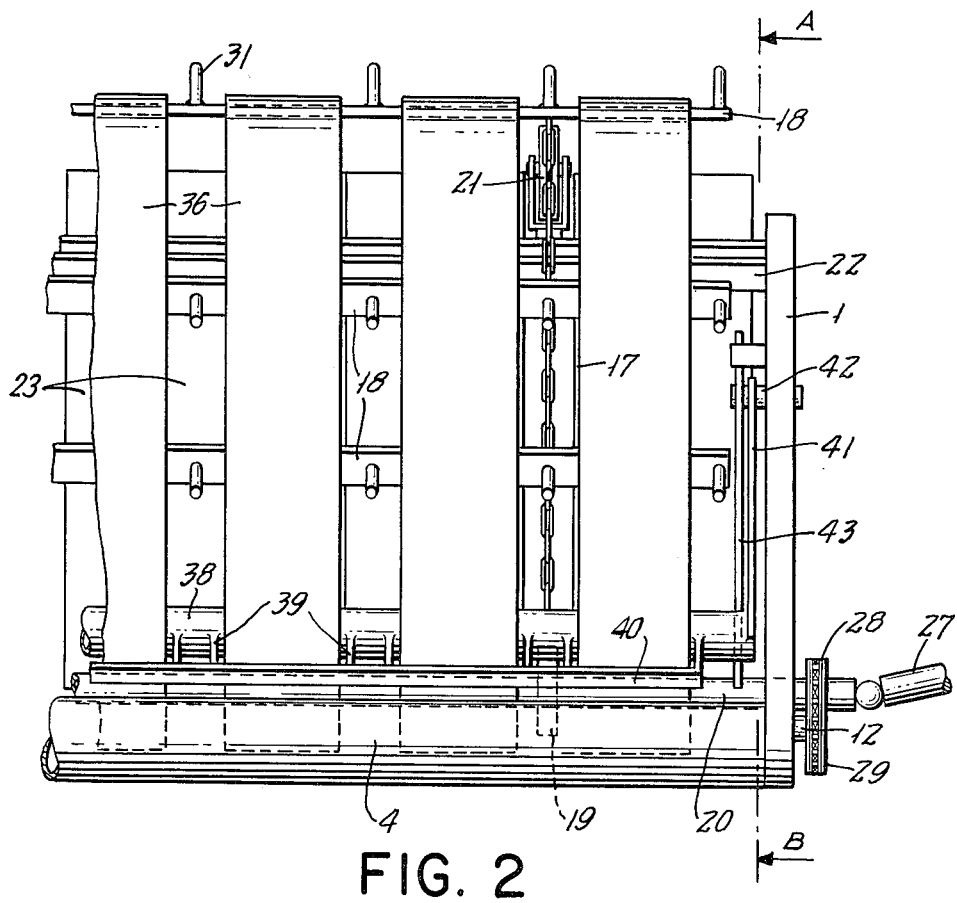
FIG. 2 is a rear view of the apparatus looking in the direction of the arrow C shown in FIG. 1.

Referring now to the drawing wherein similar reference numerals are used to refer to similar parts in both of the Figures thereof, there is shown an apparatus in accordance with the present invention which consists essentially of a pair of endless conveyor means operating in unison to locate and distribute a rolled bale 8 of agricultural material. As will be seen in FIG. 1 the apparatus of the invention basically comprises a first endless conveyor means 5 in the form of an inclined claw array and a second endless conveyor means 6 in the form of an oblique conveyer.

The receiving frame of the device consists of front and rear frame structural members 1 and 2 with these members being connected at their lower parts by a pair of support tubes 3 and 4 which lie at the same level above the ground and which extend horizontally. The first conveyer means or inclined claw array 5 extends between the frame structural members 1 and 2 and the second conveyer means or oblique conveyor 6 extends as a limiting wall on the discharge side. The tail gate or grid 7 is arranged to form an opposite wall and the claw array 5, the oblique conveyor 6 and the tail gate 7 are so mutually arranged that they will accept and retain therein the rolled bale 8.

The claw array 5 comprises two chains 9 which are connected in a spaced apart arrangement by means of transverse bars 10. The chains 9 run over a pair of drive sprocket wheels 11 which are keyed on a shaft 12 journalled in the frame of the apparatus, and two guide sprocket wheels 13 which are arranged in the frame on a support member 14 in such a manner that it can be tightened. Between the support member 14 and a second support member 15, a bottom plate 16 is arranged.

The oblique conveyor 6 is adjacent the claw array 5 and is constructed in a manner similar to the claw array. The oblique conveyor 6 comprises chains 17 which are connected by transverse bars 18. The chains are arranged to run over a pair of drive sprocket wheels 19 whose shaft 20 is journalled in the frame, and about a pair of guide sprocket wheels 21 which are arranged on a support member 22 so that they may be subsequently tightened, that is, moved so that the chains are tightened. A bottom plate 23 is carried on the support member 22 and a further support member 24.

The claw array 5 and the oblique conveyor 6 may be driven in the direction of the arrows 25, 26. The drive is from a tractor PTO shaft 27 and the shaft 20, by which the shaft 12 is driven via a chain drive 28, 29 so that the speed of advance of the claw array is approximately half that of the oblique conveyor. The claw array has a slight downward slope in the direction of conveyance while the oblique conveyer has a larger inclination.

Every second transverse member 10 of the claw array 5 is provided with retaining claws or tines 30 which are positioned alongside each other with a spacing therebetween. The ends of these tines are formed with a chamfer or oblique slope which extends in the direction opposite to the direction 25 of the conveyance. The oblique conveyor 6, on the other hand, has tearing tines 31 on each transverse member 18 and the ends of the tines 31 are made chamferred or with an oblique inclination in the direction of conveyance in order to provide for active entrainment of material.

The grid or tail gate 7 is provided with a transverse tube 32 serving as a low limitation or fence between the front and the rear structural members 1, 2 and it can be pivoted about a rod 54 and its position may be fixed by plugs 33. In this working position the tail gate 7 will have a slight oblique orientation in an outward direction in order to facilitate loading of the rolled bale 8. A spring 50 engaged between the rod 54 and the pin 52 on the tailgate 7 may also be provided to urge the tailgate 7 against a rolled bale placed in the apparatus.

For stripping of the detached material 34 from the tearing tines 31, when they change direction as at 35, the tearing tine chains 17, 18 have flat belts 36 placed loosely around them. One respective flat belt 36 lies in each intermediate space between two adjacent tearing tines 31 and the belt is guided laterally by a spacer 37. This consists of a transversely extending guide comb 38 which is provided with spacing bridge pieces 39 between which the flat belts 36 slide and are shut off from the outside by a continuous covering rail 40. The guide comb 38 is connected at each end with a respective swinging arm 41 and the swinging arms are mounted by means of pins 42 in the frame structural members 1, 2 so that they may swing to and fro. By means of a spring rod 43, carried in the frame, the spacer 37 is urged from the lower side of the oblique conveyer 6 in an outward direction against the flat belts 36 so that the flat belts cross the path of movement of the tearing tines 31 at the point 35 after they have been reversed in direction at the top end of the device.

Since the flat belts 36 are tautened each time that a transverse member 18 runs over the guide sprocket wheels 21 or 19, the spacer 37 can cause to perform a swinging movement. This leads to an additional stripping effect.

In operation, the rolled bale 8 is placed by means of a conventional transporting device, for example, a front or rear loader of a tractor, on the device. After removal of the ties from around the bale, the first endless conveyer means or claw array 5 and the second endless conveyer means or oblique conveyor 6 are driven by means of the PTO shaft 27. As a result, the load bale 8 is caused to form a rolling movement in the direction of the arrows 25, 26. A component of the force of gravity acting upon the bale, and the advance of the claw array, lead to the bale being pressed against the oblique conveyer 6. While the retaining tines 30 of the claw array 5 will insure that the rolling movement is not more rapid than the advance of the claw array, the tearing tines 31 will continuously tear or separate a layer 34 of material from the circumferential outer surface of the rolled bale and it will fling this layer laterally outwardly onto the ground.

The device of the present invention, which may be carried or drawn by the tractor, will accordingly evenly distribute the material after it has been pulled apart from the bale. It is possible to control the rate of distribution by suitable selection of the travel speed of the tractor.

As will be noted from the drawing, the first conveyer means or claw array 5 will be formed with a receiving end at the right-most extremity thereof and a discharge end at the left-most extremity thereof. Similarly, the second conveyer means or oblique conveyer 6 will be formed with a receiving end at the right-most extremity thereof and a discharge end at the left-most extremity thereof. The upper surfaces of the conveyer means 5 and 6 are formed as planar conveyer beds and the discharge end of the conveyer means 5 and the receiving end of the conveyer means 6 will extend generally parallel to each other inasmuch as the shafts 12 and 20 extend generally parallel to each other. The left-most discharge end of the first conveyer means 5 and the right-most receiving end of the second conveyer means 6 are placed adjacent one another so that the bale 8 will be in continuous contact with both of the conveyer means.

As will be noted from the drawing, the discharge end of the second conveyer means 6 is elevated a substantial distance above the receiving end of the conveyer means 5. Furthermore, it will be noted that the upward slope of the conveyer means 6 is much steeper than the downward slope of the conveyer means 5. As previously indicated, it is considered advantageous if the discharge end of the second conveyer means or oblique conveyer 6 is located a distance above the first conveyer means or claw array 5 which is at least one-quarter of the maximum diameter of the rolled bale 8. P While a specific embodiment of the invention has been shown and described in detail to illustrate the application of the inventive principles, it will be understood that the invention may be embodied otherwise without departing from such principles.

What is claimed is:

1. Apparatus for separating and distributing rolled bales of agricultural materials comprising first conveyer means, second conveyer means, each of said conveyer means having a receiving end and a discharge end and defining a generally planar conveyer bed extending between each said receiving end and discharge end along which said argicultural materials are moved, said conveyer means being arranged with said discharge end of said first conveyer means extending generally parallel to and adjacent said receiving end of said second conveyer means so that said agricultural materials may move in a given direction from said first conveyer means to said second conveyer means, each of said conveyer beds of said conveyer means being arranged to extend in an inclined direction relative to the horizontal, with the receiving end of said first conveyer means being higher than the discharge end thereof and with the discharge end of said second conveyer means being higher than the receiving end thereof, said second conveyer means being driven at a higher speed than said first conveyer means.

2. Apparatus according to claim 1 wherein said conveyer bed of said second conveyer means is arranged with a steeper upward inclination than the downward inclination of said first conveyer means.

3. Apparatus according to claim 1 wherein said first conveyer means is arranged with its conveyer bed extending at an inclination of between about 10° to 25°.

4. Apparatus according to claim 1 wherein said second conveyer means is arranged with its conveyer bed extending at an inclination of between about 35° to 50°.

5. Apparatus according to claim 1 wherein said second conveyer means is driven at a speed which is approximately twice the speed at which said first conveyer means is driven.

6. A device according to claim 1 wherein said first conveyer means comprises a claw array, said claw array being fitted with transverse bars provided with retaining tines which penetrate said rolled bale placed thereupon.

7. A device according to claim 1 wherein said second conveyer means comprise an oblique conveyer including at least two chains joined together by transverse bars and provided with tearing tines located to engage said rolled bale placed upon said oblique conveyer.

8. Apparatus according to claim 7 wherein said discharge end of said oblique conveyer is provided with stripping means for stripping agricultural material from said tearing tines.

9. Apparatus according to claim 1 wherein said discharge end of said second conveyer means is arranged to be in a distance above said first conveyer means which is at least one-quarter of the maximum diameter of said rolled bale placed upon said apparatus.

10. Apparatus according to claim 1 further including a tailgate extending generally upwardly and outwardly from said receiving end of said first conveyer means, said tailgate being pivoted at its lower end with plug means being provided for holding said tailgate at a particular pivoted location.

11. Apparatus according to claim 10 further including spring means pressing said tailgate against said rolled bale placed in said apparatus.

* * * * *